(12) United States Patent
Lee

(10) Patent No.: US 8,323,431 B2
(45) Date of Patent: Dec. 4, 2012

(54) JAMMING DETECTION METHOD AND SHEET LAMINATING APPARATUS USING SAME

(75) Inventor: Yen-Te Lee, Taipei (TW)

(73) Assignee: Primax Electronics Ltd., Taipei (TW)

( * ) Notice: Subject to any disclaimer, the term of this patent is extended or adjusted under 35 U.S.C. 154(b) by 44 days.

(21) Appl. No.: 12/561,106

(22) Filed: Sep. 16, 2009

(65) Prior Publication Data

US 2011/0011512 A1    Jan. 20, 2011

(30) Foreign Application Priority Data

Jul. 17, 2009   (TW) ................................ 98124195 A

(51) Int. Cl.
*B32B 41/00* (2006.01)
(52) U.S. Cl. .......... 156/64; 156/350; 156/351; 156/359; 156/362; 156/368; 156/583.1
(58) Field of Classification Search .................... 156/64, 156/350, 351, 359, 362, 368, 583.1
See application file for complete search history.

(56) References Cited

U.S. PATENT DOCUMENTS

| | | | |
|---|---|---|---|
| 5,041,850 A | * | 8/1991 | Kahoyashi et al. ........... 347/157 |
| 2006/0162841 A1 | * | 7/2006 | Hong .............................. 156/64 |

* cited by examiner

*Primary Examiner* — John Goff
*Assistant Examiner* — Joshel Rivera
(74) *Attorney, Agent, or Firm* — Apex Juris, pllc; Tracy M. Heims

(57) ABSTRACT

A jamming detection method and a sheet laminating apparatus using the jamming detection method are provided. The sheet laminating apparatus includes a laminating channel, a laminating roller assembly, a distance sensor, a document sensor and a controller. The distance sensor is used for measuring a moving distance of a document. The document sensor is used for detecting a transmitting status of the document. According to the moving distance of the document and the transmitting status of the document, the controller discriminates whether a jamming condition of the sheet laminating apparatus occurs.

9 Claims, 5 Drawing Sheets

JAMMING DETECTION METHOD AND SHEET LAMINATING APPARATUS USING SAME

FIELD OF THE INVENTION

The present invention relates to a sheet laminating apparatus, and more particularly to a sheet laminating apparatus for laminating a sheet article between two pieces of thermoplastic films.

BACKGROUND OF THE INVENTION

Conventionally, a sheet article such as a document or a photo is usually covered with a protective film for protection because such a sheet article is readily suffered from damage. Typically, a sheet laminating apparatus (or a laminator) is used for heating and pressing (or laminating) a sheet article between two pieces of protective films in order to achieve the protective purpose. Hereinafter, the configurations of a conventional sheet laminating apparatus will be illustrated with reference to FIG. 1.

FIG. 1 is a schematic cross-sectional view illustrating a conventional sheet laminating apparatus. As shown in FIG. 1, the sheet laminating apparatus 1 comprises a heat-treating mechanism 10, a transmitting and pressing mechanism 11 and a transfer passage 12. The heat-treating mechanism 10 includes a heater 101 and an electrically-heated plate 102. The external surface of the transmitting and pressing mechanism 11 is enclosed by the heater 101. In addition, the heater 101 is separated from the transmitting and pressing mechanism 11 by a gap.

The process for laminating a sheet article (not shown) by using the sheet laminating apparatus 1 will be described as follows. First of all, the sheet article is sandwiched between an upper thermoplastic film and a lower thermoplastic film to form a sandwich structure. Then, the sandwich structure is fed into the transfer passage 12 through an entrance 121. By means of the transmitting and pressing mechanism 11, the sandwich structure is continuously transported through the passage 12. During this stage, the electrically-heated plate 102 of the heat-treating mechanism 10 transforms electricity to heat energy so as to preheat the sandwich structure. The heat energy generated by the electrically-heated plate 102 is uniformly distributed over the heater 101, and radiated through an air gap between the heater 101 and the transmitting and pressing mechanism 11 so as to heat up the transmitting and pressing mechanism 10. The transmitting and pressing mechanism 11 presses against opposite sides of the sandwich structure that is transported through the transfer passage 12, and transmits the heat energy to the sandwich structure so as to soften the thermoplastic films. After being transmitted and pressed by the transmitting and pressing mechanism 11, the sheet article bonds with the softened thermoplastic films to form a laminate structure. Meanwhile, the sheet article is fixed between these two pieces of thermoplastic films.

For most conventional sheet laminating apparatuses utilizing heat energy to laminate sheet articles, a jamming condition is commonly found. In a case that the sheet article is adhered to the transmitting and pressing mechanism 11 during the process of transmitting and pressing the sandwich structure, or in another case that the thermoplastic films become too soft due to the elevated temperature, the possibility of causing the jamming condition in the transfer passage 12 is largely increased. If the sheet article is jammed in the transfer passage 12, the user may generally pull out the jammed sheet article by exerting a pulling force on the sheet article. If the problem of getting jammed is very serious, however, the pulling force is usually insufficient to pull out the jammed sheet article. Under this circumstance, the sheet laminating apparatus 1 may have a breakdown.

SUMMARY OF THE INVENTION

The present invention relates to a sheet laminating apparatus, and more particularly to a sheet laminating apparatus with a jamming detection function.

In accordance with an aspect of the present invention, there is provided a sheet laminating apparatus with a jamming detection function. The sheet laminating apparatus is used for laminating a document between an upper thermoplastic film and a lower thermoplastic film. The sheet laminating apparatus includes a laminating channel, a laminating roller assembly, a motor, a distance sensor, a document sensor and a controller. The laminating channel is used as a path of transmitting the document. The laminating roller assembly includes an inlet side and an outlet side. The document is fed into the laminating roller assembly through the inlet side and exited from the laminating roller assembly through the outlet side, so that said document is laminated by said laminating roller. The motor is connected with the laminating roller assembly for providing motive power to the laminating roller assembly. The distance sensor is disposed in the vicinity of the inlet side of the laminating roller assembly for measuring a moving distance S1 of the document. The document sensor is disposed in the vicinity of the outlet side of the laminating roller assembly for detecting a transmitting status of the document, wherein the document sensor is separated from the distance sensor by a spacing interval S2. The controller is connected with the distance sensor and the document sensor for discriminating whether a jamming condition of the sheet laminating apparatus occurs. If the moving distance S1 of the document measured by the distance sensor is greater than the spacing interval S2 but the document is not detected by the document sensor, the controller discriminates that the jamming condition of the sheet laminating apparatus occurs.

In an embodiment, the distance sensor includes an auxiliary wheel, a grating wheel and an optical detector. The grating wheel has an outer periphery contacted with an outer periphery of the auxiliary wheel. The optical detector is used for sensing rotation of the grating wheel. The grating wheel is rotated when the document is transported through a region between the auxiliary wheel and the grating wheel.

In an embodiment, the sheet laminating apparatus further includes a heat-treating mechanism for providing heat energy to the laminating roller assembly.

In an embodiment, the laminating roller assembly includes a first laminating roller, a second laminating roller and a power output gear. The first laminating roller includes a first transmission shaft and a first connecting gear. The first connecting gear is arranged at an end of the first transmission shaft. The second laminating roller includes a second transmission shaft, a second connecting gear and a power input gear. The second connecting gear is arranged at a first end of the second transmission shaft. The power input gear is arranged at a second end of the second transmission shaft. The second connecting gear is engaged with the first connecting gear. The power output gear is connected with the motor and engaged with the power input gear. During a laminating operation is performed by the sheet laminating apparatus, the motor provides motive power to rotate the first laminating roller in a first direction and rotate the second laminating roller in a second direction reverse to the first direction, so that the document in the laminating channel is moved toward the outlet side.

In an embodiment, the sheet laminating apparatus further includes a warning lamp. The warning lamp is turned on when the jamming condition of the sheet laminating apparatus occurs.

In an embodiment, when the controller discriminates occurrence of the jamming condition of the sheet laminating apparatus, the motor provides reverse motive power to rotate the first laminating roller in the second direction and rotate the second laminating roller in the first direction, so that the document in the laminating channel is moved toward the inlet side.

In an embodiment, when the document is moved toward the inlet side by a backward distance S3, the warning lamp is turned off.

In accordance with another aspect of the present invention, there is provided a jamming detection method of a sheet laminating apparatus for detecting whether a document between an upper thermoplastic film and a lower thermoplastic film is jammed in a laminating channel. Firstly, a distance sensor is provided for measuring a moving distance S1 of the document that is moved in the laminating channel and in a feeding direction. Then, a document sensor is provided to detect a transmitting status of the document in the laminating channel, wherein the distance sensor is separated from the document sensor by a spacing interval S2. According to the moving distance S1 of the document, the spacing interval S2 and the transmitting status of the document in the laminating channel, a controller discriminates whether a jamming condition occurs. If the moving distance S1 is greater than the spacing interval S2 but the document is not detected by the document sensor, the jamming condition occurs.

In an embodiment, when the jamming condition occurs, the jamming detection method further includes steps of generating a warning signal and moving the document in a backward direction.

In an embodiment, when the document is moved toward the inlet side by a backward distance S3, the warning signal is stopped.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
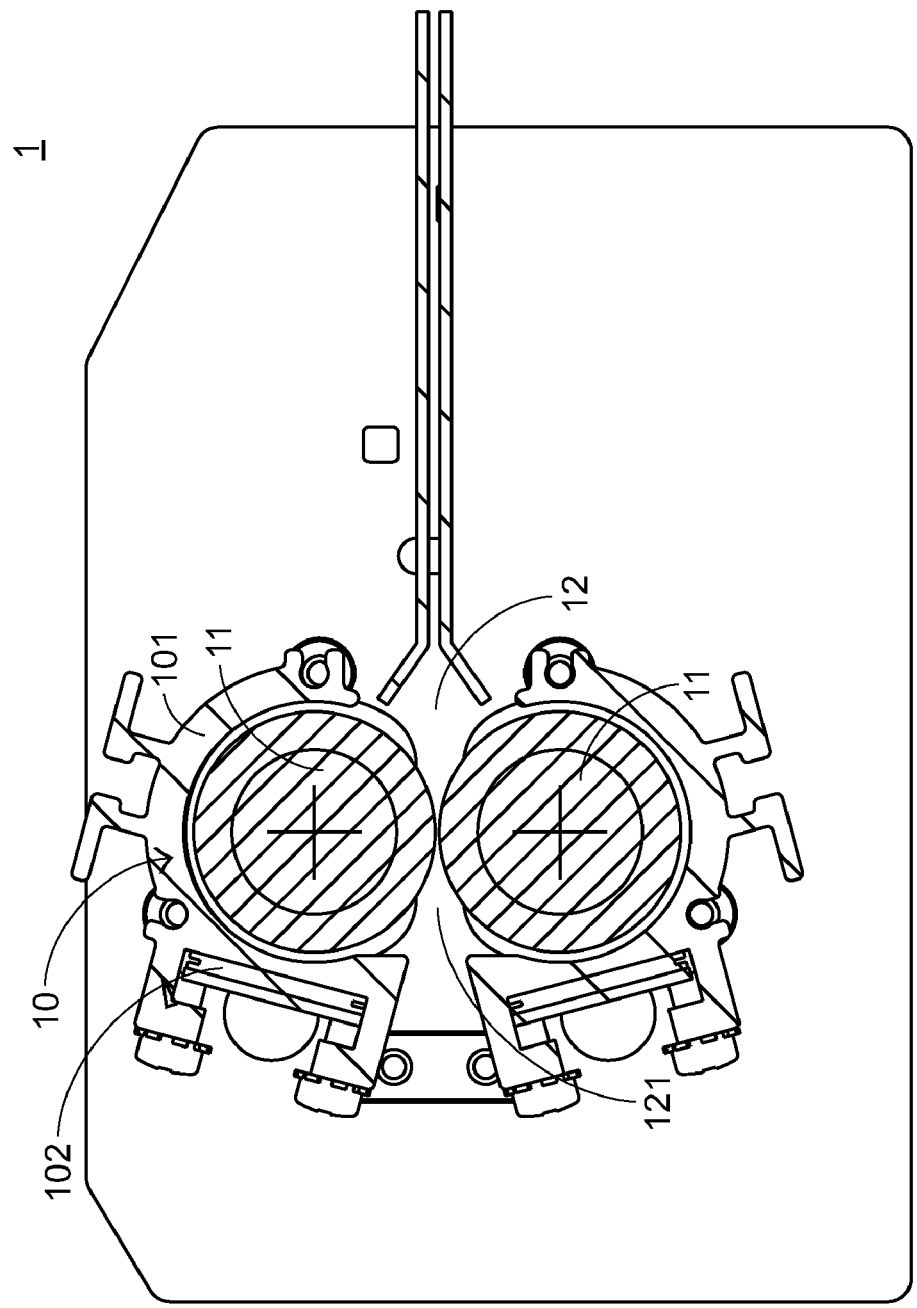
FIG. 1 is a schematic cross-sectional view illustrating a conventional sheet laminating apparatus.
Figure 2:
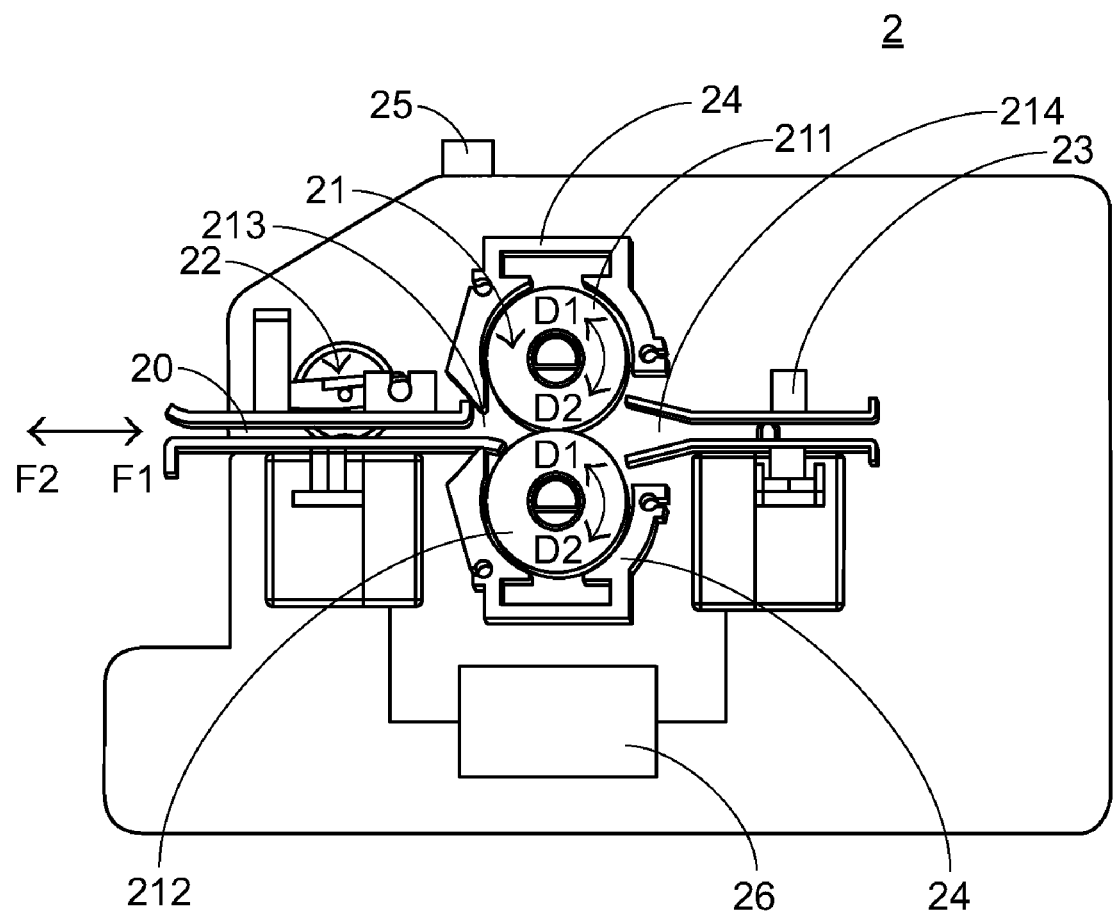
FIG. 2 is a schematic cross-sectional view illustrating a sheet laminating apparatus according to an embodiment of the present invention.

FIG. 2 is a schematic cross-sectional view illustrating a sheet laminating apparatus according to an embodiment of the present invention. As shown in FIG. 2, the sheet laminating apparatus 2 comprises a laminating channel 20, a laminating roller assembly 21, a distance sensor 22, a document sensor 23, a heat-treating mechanism 24, a warning lamp 25, a controller 26 and a motor 27 (see FIG. 3). The laminating roller assembly 21 has an inlet side 213 and an outlet side 214. The distance sensor 22 is disposed in the vicinity of the inlet side 213 and located in the position A (see FIG. 6). The document sensor 23 is disposed in the vicinity of the outlet side 214 and located in the position B (see FIG. 6). There is a spacing interval S2 between the position A and the position B (see FIG. 6). In addition, the controller 26 is connected with the distance sensor 22 and the document sensor 23. The external surface of the laminating roller assembly 21 is enclosed by the heat-treating mechanism 24. In addition, the heat-treating mechanism 24 is separated from the laminating roller assembly 21 by a gap.

Figure 3:
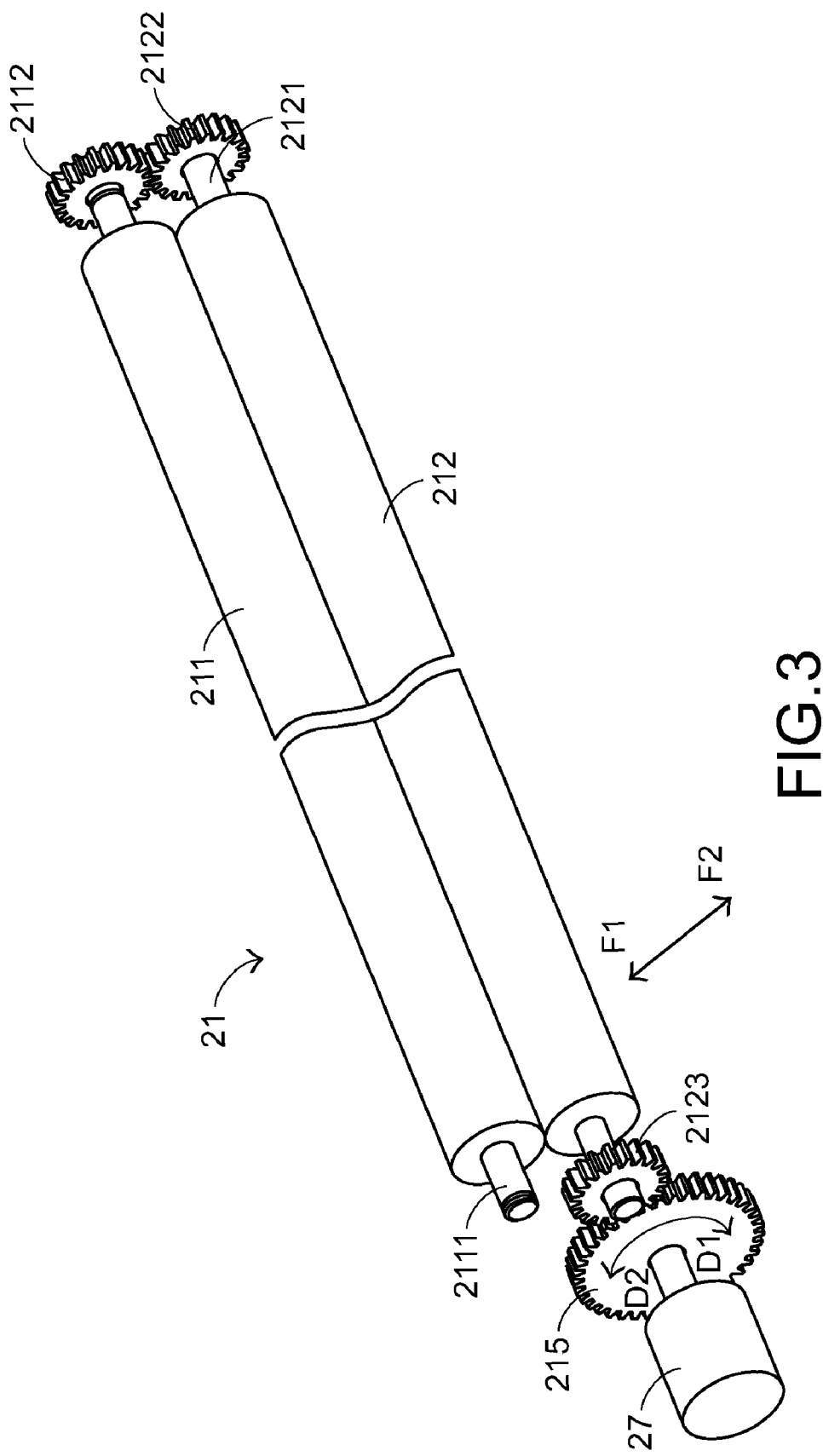
FIG. 3 is a schematic perspective view illustrating an exemplary laminating roller assembly used in the sheet laminating apparatus according to the embodiment of the present invention.

FIG. 3 is a schematic perspective view illustrating an exemplary laminating roller assembly used in the sheet laminating apparatus according to the embodiment of the present invention. The motor 27 is connected with the laminating roller assembly 21 for providing motive power to the laminating roller assembly 21. The laminating roller assembly 21 comprises a first laminating roller 211, a second laminating roller 212 and a power output gear 215. The first laminating roller 211 comprises a first transmission shaft 2111 and a first connecting gear 2112. The first connecting gear 2112 is arranged at an end of the first transmission shaft 2111. The second laminating roller 212 comprises a second transmission shaft 2121, a second connecting gear 2122 and a power input gear 2123. The second connecting gear 2122 and the power input gear 2123 are arranged at opposite ends of the second transmission shaft 2121. The second connecting gear 2122 is engaged with the first connecting gear 2112. The power output gear 215 is connected with the motor 27 and engaged with the power input gear 2123.

Figure 4:
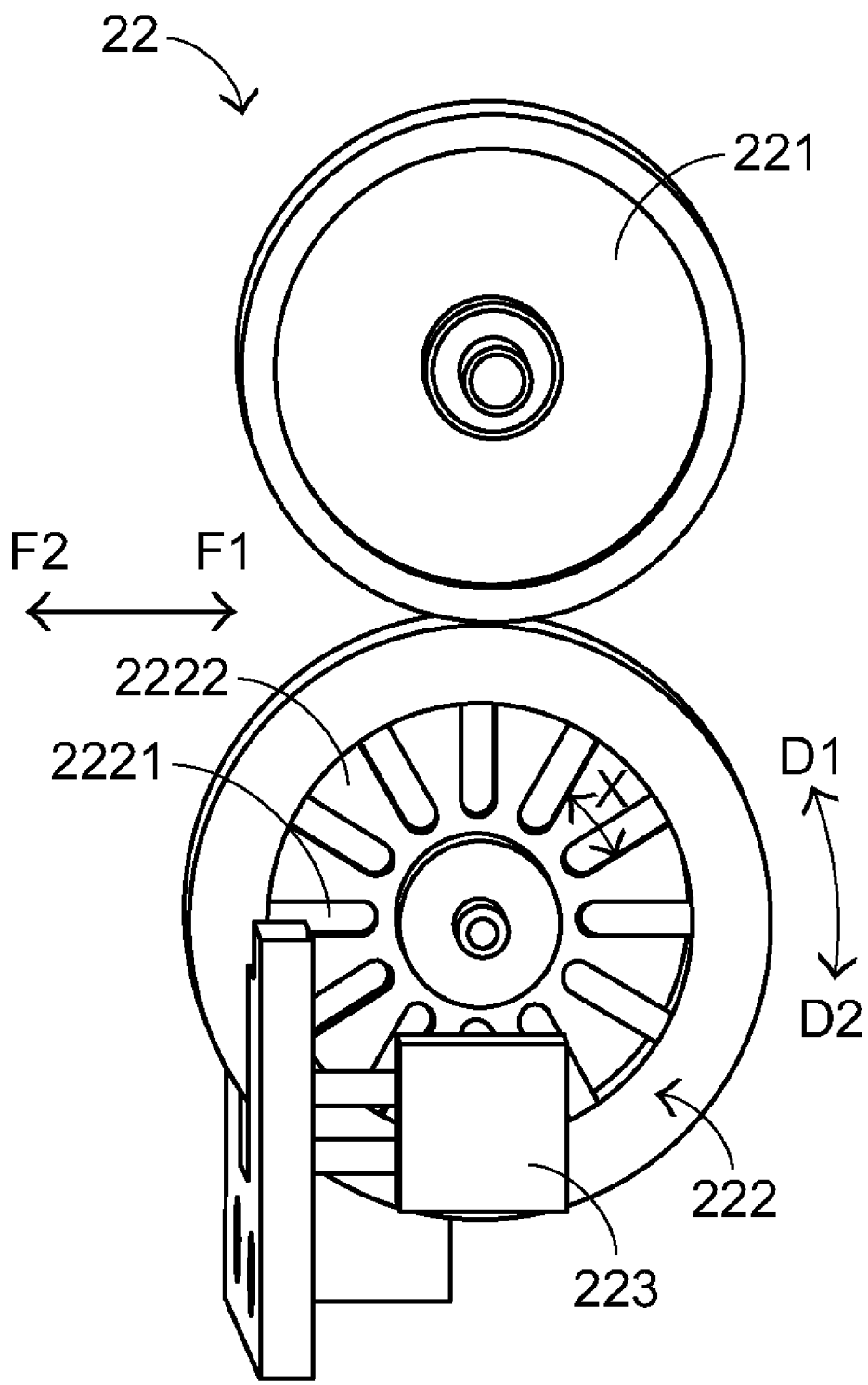
FIG. 4 is a schematic perspective view illustrating an exemplary distance sensor used in the sheet laminating apparatus according to the embodiment of the present invention.
Figure 6:
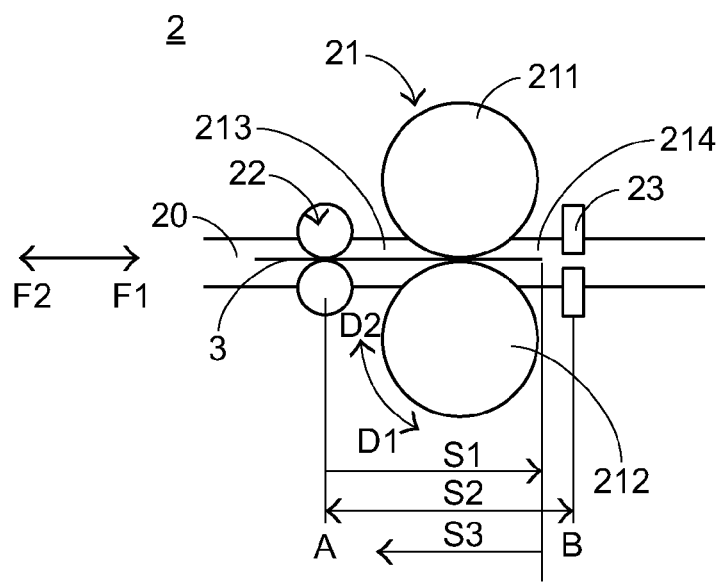
FIG. 6 is a schematic view illustrating a jamming detection mechanism of the sheet laminating apparatus of the present invention.

FIG. 4 is a schematic perspective view illustrating an exemplary distance sensor used in the sheet laminating apparatus according to the embodiment of the present invention. The distance sensor 22 comprises an auxiliary wheel 221, a grating wheel 222 and an optical detector 223. The outer periphery of the auxiliary wheel 221 is contacted with the outer periphery of the grating wheel 222. The grating wheel 222 comprises multiple hollow portions 2221 and multiple non-hollow portions 2222. The hollow portions 2221 and the non-hollow portions 2222 are alternatively and discretely arranged at regular intervals. When a sheet article (e.g. a document 3 as shown in FIG. 6) intervening between an upper thermoplastic film and a lower thermoplastic film is fed into the region between the auxiliary wheel 221 and the grating wheel 222 in a feeding direction F1, friction forces are respectively generated between the document 3 and the auxiliary wheel 221 and between the document 3 and the grating wheel 222. Due to the friction forces, the auxiliary wheel 221 is rotated in a first direction D1 but the grating wheel 222 is rotated in a second direction D2, wherein the second direction D2 is reverse to the first direction D1. In the assistance of the auxiliary wheel 221, the two thermoplastic films are simultaneously transported across the distance sensor 22. During rotation of the grating wheel 222, the optical detector 223 will detect the hollow portions 2221 and the non-hollow portions 2222 of the grating wheel 222. When one hollow portion 2221 and one adjacent non-hollow portion 2222 are detected, it is meant that the grating wheel 222 has been rotated by a specified distance X. By accumulating the specified distance X during rotation of the grating wheel 222, the distance sensor 22 could acquire the shift amount of the document 3 after passing through the distance sensor 22. That is, the shift amount of the document 3 is equal to the moving distance S1 after the document 3 is transported across the position A (see FIG. 6).

Please refer to FIGS. 2 and 3 again. Before the sheet laminating apparatus 2 is employed to laminate the document, electrical energy is converted into heat energy by the heat-treating mechanism 24. The heat energy generated by the heat-treating mechanism 24 is radiated through an air gap between the heat-treating mechanism 24 and the laminating roller assembly 21 so as to heat up the laminating roller assembly 21. As such, the surface temperatures of the first laminating roller 211 and the second laminating roller 212 are increased. When the surface temperatures of the first laminating roller 211 and the second laminating roller 212 reach their working temperatures, the laminating operation of the sheet laminating apparatus 2 could be implemented. The laminating channel 20 is used as a path of transmitting the document 3. The document sensor 23 is used to detect the transmitting status of the document 3.

The process for laminating the document 3 by using the sheet laminating apparatus 2 will be described as follows. First of all, the document 3 is fed into the sheet laminating apparatus 2 in the feeding direction F1. At the same time, the motor 27 offers positive motive power to the power output gear 215. In response to the positive motive power, the power output gear 215 is rotated in the first direction D1.

Since the power output gear 215 is engaged with the power input gear 2123, the power input gear 2123 is rotated in the second direction D2. In response to the rotation of the power input gear 2123, the second transmission shaft 2121 and the second connecting gear 2122 are synchronously rotated in the second direction D2. Since the second connecting gear 2122 is engaged with the first connecting gear 2112, the first connecting gear 2112 is rotated in the first direction D1. In response to the rotation of the first connecting gear 2112, the first transmission shaft 2111 is synchronously rotated in the first direction D1. At the same time, the first laminating roller 211 and the second laminating roller 212 are respectively rotated in the first direction D1 and the second direction D2. By the first laminating roller 211 and the second laminating roller 212, the document 3 is laminated, and the document 3 in the laminating channel 20 is transported toward the outlet side 214 of the laminating roller assembly 21.

Figure 5:
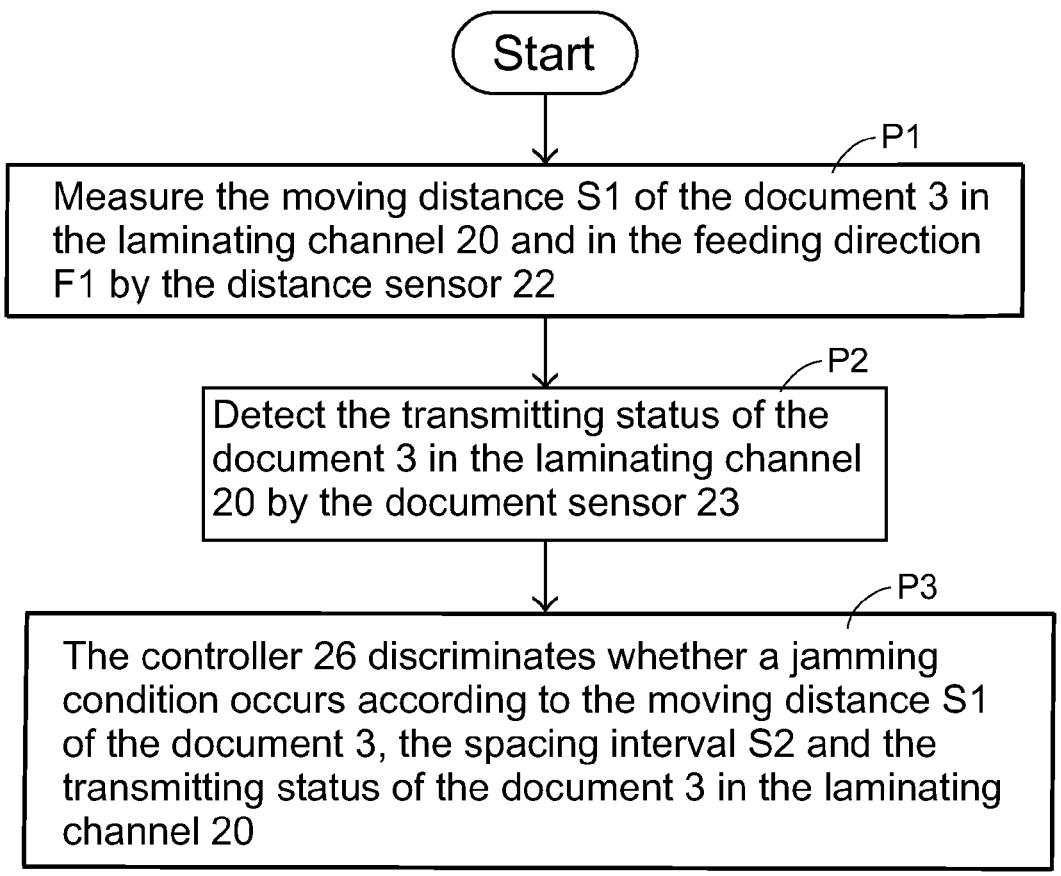
FIG. 5 is a flowchart illustrating a jamming detection method according to the present invention.

The present invention also provides a jamming detection method. FIG. 5 is a flowchart illustrating a jamming detection method according to the present invention. First of all, the moving distance S1 of the document 3 in the laminating channel 20 and in the feeding direction F1 is measured by the distance sensor 22 (Step P1). Next, the transmitting status of the document 3 in the laminating channel 20 is detected by the document sensor 23 (Step P2). According to the moving distance S1 of the document 3, the spacing interval S2 between the distance sensor 22 and the document sensor 23 and the transmitting status of the document 3 in the laminating channel 20, the controller 26 discriminates whether a jamming condition occurs (Step P3).

The concept of the jamming detection mechanism will be illustrated with reference to FIG. 6. FIG. 6 is a schematic view illustrating a jamming detection mechanism of the sheet laminating apparatus of the present invention. When a sheet article intervening between an upper thermoplastic film and a lower thermoplastic film (e.g. a document 3) is fed into the laminating channel 20 of the sheet laminating apparatus 2 in a feeding direction F1, the distance sensor 22 is enabled to detect the moving distance S1 of the document 3 after the document 3 is transported across the position A (see also the Step P1 of FIG. 5). As the first laminating roller 211 and the second laminating roller 212 are continuously rotated, the document 3 is advanced in the laminating channel 20. Next, the transmitting status of the document 3 in the laminating channel 20 is detected by the document sensor 23 (see also the Step P2 of FIG. 5). When the moving distance S1 detected by the distance sensor 22 is greater than the spacing interval S2 between the position A and the position B, the document sensor 23 will detect whether the document 3 is transported across the position B. If no jamming condition occurs and the moving distance S1 of the document 3 is greater than the spacing interval S2 between the distance sensor 22 and the document sensor 23, the document sensor 23 detects that the document 3 is transported across the position B. In the Step P3 of FIG. 5, the detecting signals of the distance sensor 22 and the document sensor 23 are received by the controller 26. If the moving distance S1 of the document 3 is greater than the spacing interval S2 but the document 3 is not detected by the document sensor 23, it is meant that the document 3 is abnormally transmitted in the laminating channel 20. The abnormal transmitting status includes for example a jamming condition of the document 3 such that the document 3 fails to be smoothly advanced. Meanwhile, the controller 26 discriminates that the document 3 is jammed in the laminating roller assembly 21 or the laminating channel 20.

Once the controller 26 discriminates occurrence of the jamming condition of the sheet laminating apparatus 2, the warning lamp 25 is turned on to notify the user. At the same time, the motor 27 provides reverse power. In response to the reverse power, the first laminating roller 211 and the second laminating roller 212 are rotated in the directions reverse to the laminating operation. That is, the first laminating roller 211 is rotated in the second direction D2 but the second laminating roller 212 is rotated in the first direction DA. Under this circumstance, the jammed document 3 is moved in the laminating channel 20 toward the inlet side 213 of the laminating roller assembly 21 and in the withdrawing direction F2 by a backward distance S3, so that the document 3 is withdrawn from the laminating roller assembly 21. When the document 3 is withdrawn by a backward distance S3, the warning lamp 25 is turned off.

From the above description, the sheet laminating apparatus 2 of the present invention is capable of detecting whether the document is suffered from a jamming condition. In addition, the laminating roller assembly 21 could be reversely rotated in order to allow the jammed document in the laminating channel 20 to be withdrawn from the laminating roller assembly 21. Since the user needs not to manually pull out the jammed document 3, the possibility of damaging the document 3 and the damaging rate of the sheet laminating apparatus 2 are both reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sheet laminating apparatus with a jamming detection function, said sheet laminating apparatus being used to laminate a document between an upper thermoplastic film and a lower thermoplastic film and comprising:
   a laminating channel used as a path of transmitting said document;
   a laminating roller assembly including an inlet side and an outlet side, wherein said document is fed into said laminating roller assembly through said inlet side and exited from said laminating roller assembly through said outlet side, so that said document is laminated by said laminating roller;
   a motor connected with said laminating roller assembly for providing motive power to said laminating roller assembly;
   a distance sensor disposed in the vicinity of said inlet side of said laminating roller assembly for measuring a moving distance S1 of said document where said distance sensor comprises;
      an auxiliary wheel;
      a grating wheel having an outer periphery contacted with an outer periphery of said auxiliary wheel; and
      an optical detector for sensing rotation of said grating wheel,
      wherein said grating wheel is rotated when said document is transported through a region between said auxiliary wheel and said grating wheel;
   a document sensor disposed in the vicinity of said outlet side of said laminating roller assembly for detecting a transmitting status of said document, wherein said document sensor is separated from said distance sensor by a spacing interval S2; and
   a controller connected with said distance sensor and said document sensor for discriminating whether a jamming condition of said sheet laminating apparatus occurs, wherein if said moving distance S1 of said document measured by said distance sensor is greater than said spacing interval S2 but said document is not detected by said document sensor, said controller discriminates that said jamming condition of said sheet laminating apparatus occurs.

2. The sheet laminating apparatus with a jamming detection function according to claim 1 wherein said sheet laminating apparatus further comprises a heat-treating mechanism for providing heat energy to said laminating roller assembly.

3. The sheet laminating apparatus with a jamming detection function according to claim 1 wherein said laminating roller assembly comprises:
   a first laminating roller comprising a first transmission shaft and a first connecting gear, wherein said first connecting gear is arranged at an end of said first transmission shaft;
   a second laminating roller comprising a second transmission shaft, a second connecting gear and a power input gear, wherein said second connecting gear is arranged at a first end of said second transmission shaft, said power input gear is arranged at a second end of said second transmission shaft, and said second connecting gear is engaged with said first connecting gear; and
   a power output gear connected with said motor and engaged with said power input gear,
   wherein during a laminating operation is performed by said sheet laminating apparatus, said motor provides motive power to rotate said first laminating roller in a first direction and rotate said second laminating roller in a second direction reverse to said first direction, so that said document in said laminating channel is moved toward said outlet side.

4. The sheet laminating apparatus with a jamming detection function according to claim 3 wherein said sheet laminating apparatus further comprises a warning lamp, wherein said warning lamp is turned on when said jamming condition of said sheet laminating apparatus occurs.

5. The sheet laminating apparatus with a jamming detection function according to claim 4 wherein when said controller discriminates occurrence of said jamming condition of said sheet laminating apparatus, said motor provides reverse motive power to rotate said first laminating roller in said second direction and rotate said second laminating roller in said first direction, so that said document in said laminating channel is moved toward said inlet side.

6. The sheet laminating apparatus with a jamming detection function according to claim 5 wherein when said document is moved toward said inlet side by a backward distance S3, said warning lamp is turned off.

7. A jamming detection method of a sheet laminating apparatus for detecting whether a document between an upper thermoplastic film and a lower thermoplastic film is jammed in a laminating channel, said jamming detection method comprising steps of:
   providing a distance sensor for measuring a moving distance S1 of said document that is moved in said laminating channel and in a feeding direction where said distance sensor uses an auxiliary wheel, a grating wheel having an outer periphery contacting with an outer periphery of said auxiliary wheel and an optical detector for sensing rotation of said grating wheel in order to calculate distance;
   measuring said moving distance S1 with said distance sensor by inserting and transporting said document through a region between said auxiliary wheel and said grating wheel thus causing rotation of said grating wheel;
   providing a document sensor to detect a transmitting status of said document in said laminating channel, wherein said distance sensor is separated from said document sensor by a spacing interval S2; and
   discriminating whether a jamming condition occurs according to said moving distance S1 of said document, said spacing interval S2 and said transmitting status of said document in said laminating channel, wherein if said moving distance S1 is greater than said spacing interval S2 but said document is not detected by said document sensor, said jamming condition occurs.

8. The jamming detection method according to claim 7 wherein when said jamming condition occurs, said jamming detection method further comprises steps of generating a warning signal and moving said document in a backward direction.

9. The jamming detection method according to claim 8 wherein when said document is moved toward said inlet side by a backward distance S3, said warning signal is stopped.

* * * * *